May 30, 1961   E. C. KOERPER ET AL   2,986,305
SMALL SEED PLANTER
Filed Feb. 17, 1958

INVENTORS
ERHARDT C. KOERPER
LESTER M. KOELSCH
PERRY ANDERSON

BY *Miles Henninger*
ATTORNEY

United States Patent Office 2,986,305
Patented May 30, 1961

2,986,305

SMALL SEED PLANTER

Erhardt C. Koerper, Lester M. Koelsch, and Perry Anderson, Milwaukee, Wis., assignors to Koerper Engineering Associates, Inc., Milwaukee, Wis., a corporation of Wisconsin Filed Feb. 17, 1958, Ser. No. 715,760

4 Claims. (Cl. 221—211)

This invention relates to improvements in devices for picking up and placing small objects in predetermined patterns and spacing on a surface remote from the pick-up point, such as small seeds to be taken from a hopper and be deposited in the ground in predetermined pattern and at predetermined spacing.

Some seeds such as celery seeds are so small that approximately one and one-quarter million seeds are required to make a pound. Any method of planting other than the use of some device capable of precisely placing single seeds in a predetermined pattern and spacing, is wasteful of seeds and is time-consuming. After seeds placed by usual methods have germinated and grown to to size where the plants can be grasped manually, it is usual practice to thin out by hand some of the plants growing too close to each other. Such "hand-thinning" of plants is laborious, slow and expensive. The work is so monotonuous that only a few types of persons will do that work. Such persons do not exercise care in thinning the plants so that more hardy plants are frequently pulled out and the root systems of adjacent plants to be left standing are so disturbed as to retard growth. It is desirable both from the viewpoint of the grower and of the workers to plant only sufficient seed in a given pattern and spacing to reduce the hand-thinning labor and minimize disturbances of roots of the plants to be left growing. The exact spacing of growing plants is especially important with some commercial crops to secure more uniform products by providing uniform growing conditions of light, air, plant nutrition and moisture. Such spacing is also important in cultivating and harvesting.

The present invention provides a rotating chamber with the interior thereof under vacuum and having apertures through a wall in a predetermined pattern and spacing and of such size that individual objects can be picked up at the apertures and conveyed to a discharge tube or tubes for placing the objects in a location remote from the pick-up point in the same relative pattern and spacing as the holes in the drum. Larger objects will drop off the chamber by their own weight when the vacuum acting on the objects is cut off or such objects may be removed by a brush, scraper or the like. However, smaller objects require positive means for releasing them from their individual positions on a surface of a rotating chamber and conducting them through a discharge tube or tubes so that the objects are placed in substantially the same relative pattern and spacing as that of the apertures of the chamber. Such means are shown herein as sealing off the vacuum acting on the objects and applying air under pressure to the side of the objects formerly under vacuum.

Figure 1:
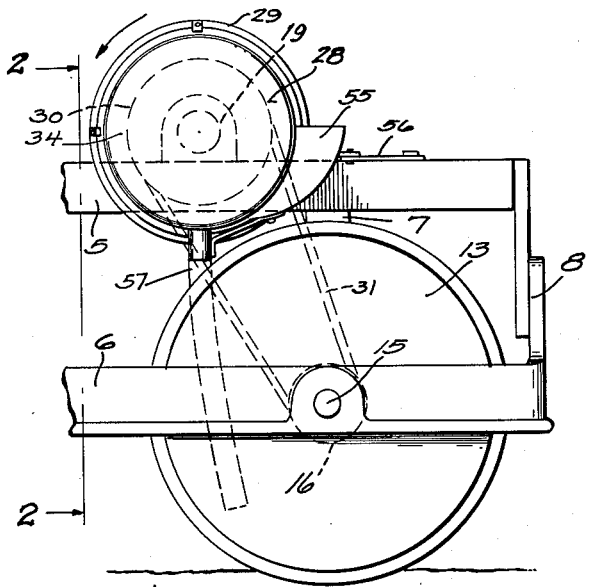
Figure 1 is a side elevation of a fragment of a device, illustrating only those parts entering into the present invention.
Figure 2:
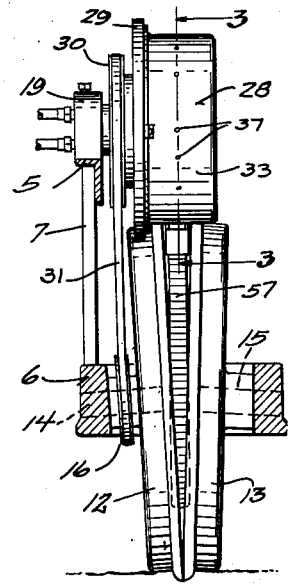
Figure 2 is a rear elevation of the portions of the device shown in Figure 1.
Figure 3:
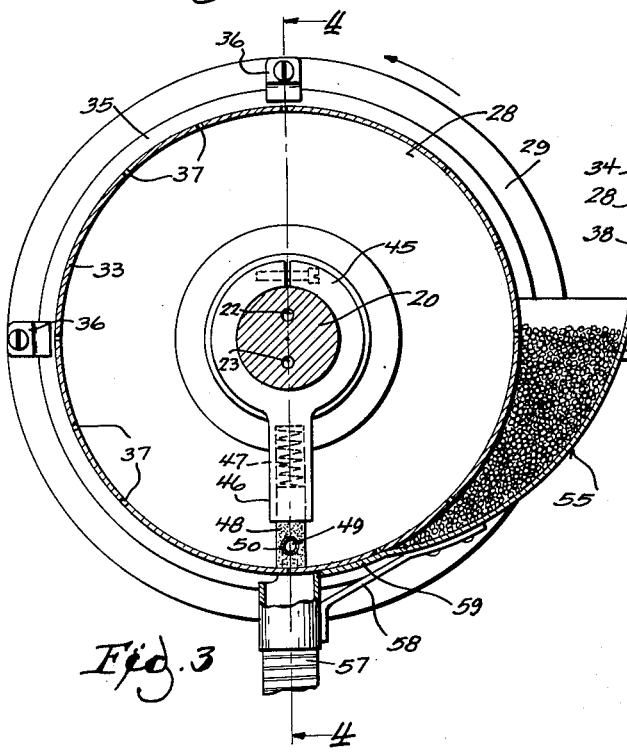
Figure 3 is a side view on the plane of line 3—3 of Figure 2 and shows portions of the present structure in a cross-sectional plane at right angles to the axis of rotation of a portion of the device.
Figure 4:
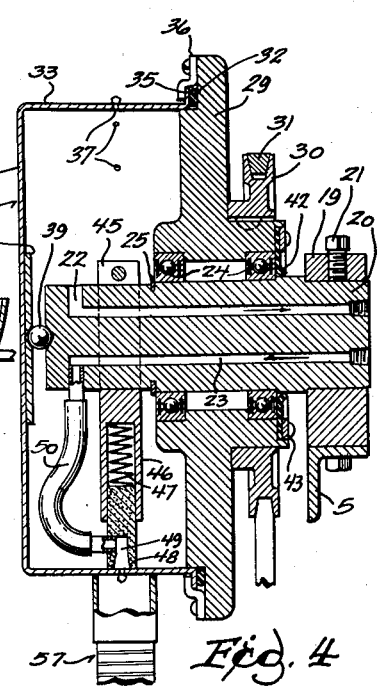
Figure 4 is a vertical cross-section on the plane 4—4 of Figure 3, and through the axis of rotation of the device.

Referring particularly to the drawing, numerals 5 and 6 designate horizontal frame members and 7 and 8 designate vertical frame members, the frame being provided with suitable wheels, a hitch, and the like (not shown) by which the device may be drawn or carried by tractive power of some kind over a surface on or in which the seeds are to be placed. Herein, a pair of disks or flanged wheels 12, 13 acting as disks, rotate on axles 14, 15 set at an angle in the frame 5–8 such that the edges of the disks meet below ground level and then separate for opening a furrow in which the seeds are to be placed. Other known means may be used for opening and for closing the furrow. A pulley 16 is mounted on the axle of wheel 12 as a part of a belt drive from the wheels 12, 13 to other parts of the device. Any other suitable drive may be substituted.

A pedestal 19 is mounted on frame member 5 and has a hole into which is inserted a shaft 20 held in fixed position as by a set screw 21. The shaft is readily removable and replaceable and adjustably extends over the disks 12, 13. Shaft 20 is formed with at least two passages 22, 23 extending longitudinally therein and which are severally brought out to the periphery of the shaft. Bearings 24 are seated on the shaft 20 between a shoulder thereon and a snap ring 25 to support a rotating chamber generally designated 28.

The chamber 28 comprises an end plate 29 with a shoulder on one side for mounting of a pulley 30 thereon to be connected by a belt 31 with the pulley 16. End plate 29 is relatively heavy so that it resists deformation when subjected to atmospheric pressure on one side and partial vacuum (differential pressure) on the other side, and has a hub of considerable length so that bearings 24 can be widely spaced. End plate 29 has a peripheral rabbet in the other side for receiving a gasket 32 on which is seated the rotating chamber illustrated herein as providing a cylindrical surface 33, a planar end wall 34 and a flange 35 from surface 33. The flange is to be held in vacuum tight relation on the end plate 29 by seating on a gasket 32 under the action of clamps 36 and is held in vacuum tight relation to the end plate by the clamps aided by atmospheric pressure on the outside of the drum.

The cylindrical drum portion 33 is provided with apertures 37 of predetermined size and at predetermined spacing. The drum 33—37 is preferably of corrosion resistant material such as aluminum, stainless steel or alloys so that it may be of thin gauge material and thus provide an inexpensive and interchangeable part with different patterns and spacing and size of apertures. Drum 33—37 is provided on the inner side of the end wall 34 with a pressure plate 38 having a socket for a ball 39 which also bears in a socket in an end of shaft 20 to resist deflection of the end wall when subjected to atmospheric pressure on one side and vacuum on the other side. A suitable anti-friction thrust bearing can be used as a substitute for the ball and sockets.

It will be understood that drum 33—37 may be conical, dish-shaped or other shape and that the apertures 37 may be placed in end wall 34 or any other location from which the seeds may pass into delivery tubes or merely dropped. The size of apertures is selected to give the best holding of single seeds under the present vacuum-pressure conditions dependent on the size, shape, surface conditions and weight of seeds being handled.

A seal is provided on the outside of end plate 29 to avoid air leakage through bearings 24 and comprises a resilient annular member 42 set into a rabbet in the end plate around shaft 20 and bearing on the shaft. The seal 42 is held on the end plate by a ring 43 or other suitable means.

A holder 45 is adjustably clamped on shaft 20 and has a socket in an extension 46 toward and centered over the row of apertures 37 in drum 33—37. A compression spring 47 is seated in the extension socket and acts on a sealing shoe 48 of graphite or similar material to seat and seal the shoe end surface on the inner side of the drum periphery 33 as the shoe is pressed against such periphery. A passage 49 is formed in the shoe from the end thereof bearing on the drum and such passage is connected by a tube 50 with the passage 23 in the shaft 20 by which air under pressure is successively directed through the apertures in the drum and as the drum rotates. Air pressure may be alternatively brought to the end of the shoe 48 on the drum by a passage through the shoe to the spring socket and a passage through shoe holder 45, 46 to connect with shaft passage 23. Such alternate construction is relatively cheap and has the advantage of using the pressure of the air in providing some of the sealing pressure. Suitable sealing means are applied to the holder and shoe when air pressure is used to secure seating of the shoe.

A hopper 55 is mounted by a bracket 56 on the frame 5-8 and has an open side, the edges defining such side being in contact or sealed with the drum periphery 33 so that seeds cannot escape between the drum and the hopper edges. It may be desirable in the planting of some small seeds, that the edges of the open hopper side be resiliently sealed to the drum periphery. The hopper may be of any shape as long as the edges of its open side conform to an arc of the drum periphery but it is generally desirable that the hopper be of varying cross-section so that its open side may extend over a number of drum apertures 37 whereby the apertures are exposed to the seeds under different conditions of height and packing of seeds in the hopper.

A discharge tube 57 is mounted as by a bracket 58 on the hopper 55 or on the frame. One end of the tube is shaped to provide an opening for the passage thereinto of seeds held on the drum but otherwise conforms quite closely to the drum periphery 33. The tube extends downwardly between the disks 12, 13 with its end closely adjacent the point at which the disk edges meet within the ground so that seeds passing downwardly through the discharge tube are deposited in a given relation to and within the furrow formed by the disks. A strip 59 of a hopper side extends into contact with the wall of discharge tube 57 in close conformity to the arc of the drum periphery 33 to seal apertures 37 which are free from seeds between the tube and the hopper. Felt strips between the edges of the open hopper side and strip 59 and the drum surface 33 have been found to seal adequately. It will be understood that discharge tubes need not be used for some objects and even some small seeds which can be deposited under gravity action alone.

In use, the hopper 55 is filled with seeds and a vacuum source is connected with shaft passage 22 while a pressure source is connected with the shaft passage 23. As apertures 37 in the drum surface 33 pass along the length of the hopper, seeds are drawn to seat one seed over each aperture. The seeds are held on the drum as it rotates to bring the apertures and seeds successively opposite the air passage in shoe 48. Air under pressure is applied to the shaft passage 23, the tube 50 and the shoe passage 49, and the device is drawn along the ground. As the apertures holding the seeds come opposite the shoe air passage 49, the aid pressure positively unseats the seed and the seed is blown or drops into the discharge tube 57.

As the device is drawn along the ground, the disks 12, 13 open a furrow into which the discharge tube extends and seeds drop or are blown into the tube and delivered to the furrow so that the pattern and spacing of the seeds in the furrow is proportional to the aperture spacing of the drum. The furrows are closed by any one of several well known means such as another pair of plows or the like and which are not shown.

It will be obvious that apertures may be made in the drum in several rows, each row then having its own seed release shoe and discharge tube so that the objects may be placed in any lateral relative position within the furrow rather than in line. It will be seen that the structure described above provides means for placing individual objects in a precise pattern in which the spacing and grouping of the objects can be readily changed if desired. The objects are picked up from a reservoir in a given pattern and spacing and are individually released and discharged so that the objects come to rest in a pattern and spacing proportional to that of the drum. The pattern and size of the means for picking up the objects is readily varied and the placing of such objects conforms to the pattern and spacing regardless of the speed at which the device as a whole is being moved in relation to the surface on which the objects are to be deposited. However, the shaft and chamber are readily removable so that the driving means may be changed a secure any desired linear speed ratio between the drive wheel and the chamber. Under some dusty conditions it is desirable to enclose the rotating chamber and hopper and to apply air pressure to the enclosure. Such enclosure then serves as the pressure source to the shoe.

We claim:

1. A device for picking up small objects and depositing the objects in a predetermined pattern and spacing on a surface remote from the pick-up points, comprising a frame mounted for movement relative to said remote surface, a shaft mounted stationary on the frame and in readily removable relation thereto, a chamber mounted on the shaft and removable from the frame with the shaft, the chamber comprising a plate having a hub for rotatably supporting the chamber on the shaft, an open-ended drum supported by the plate and having apertures in the peripheral wall thereof in a given pattern and means for clamping the edge of the drum to the plate in readily removable relation and for sealing the drum to the plate for evacuation of the chamber, a hopper for receiving objects under atmospheric pressure and having a side open adjacent the aperture drum wall for pick-up of the objects from the hopper over the drum apertures, means for rotating the chamber relative to the hopper, and means within the chamber for interrupting action of the vacuum on and releasing the objects from the chamber to a given position thereof.

2. A device for picking up small objects and depositing the objects in a predetermined pattern and spacing on a surface remote from the pick-up points, comprising a frame mounted for movement relative to said remote surface, an apertured pedestal mounted on the frame, a shaft mounted in the pedestal aperture in readily removable relation thereto, a chamber mounted on the shaft and removable from the frame therewith, the shaft comprising a plate having a hub for rotatably supporting the chamber on the shaft and a drum supported by he plate and having apertures in the peripheral wall thereof in a given pattern, the drum having an open end with a flange outwardly therefrom and the plate having a rabbet for receiving the flange, a resilient gasket in the plate rabbet for seating the drum flange and a ring clamp bearing on the drum flange around the entire periphery of the drum and attached to the plate in readily removable relation whereby a drum may be readily interchanged and attached to the plate in vacuum-tight relation, a hopper for receiving objects under atmospheric pressure and having a side open adjacent the apertured drum wall for pick-up of the objects from the hopper over the drum apertures, means for rotating the chamber relative to the hopper, and means within the chamber for interrupting action of the vacuum on and releasing the objects from the chamber at a given position thereof.

3. A device for picking up small objects and depositing the objects in a predetermined pattern and spacing on a surface remote from the pick-up point, comprising a frame mounted for movement relative to said remote surface, a stationary shaft removably mounted on the frame and having passages for air flow therethrough, a chamber rotatably mounted on the shaft and sealed thereto in air-tight relation, one of said shaft passages serving for evacuation of the chamber, the chamber comprising a hub and plate rotatably mounted on the shaft and forming one wall of the chamber and being of substantial thickness for resisting deformation by air pressure upon evacuation of the chamber and a thin-wall open-ended drum supported in air-tight relation on the plate and forming the other walls of the chamber, the drum wall having apertures therein and being mounted in readily interchangeable relation on the hub and plate, the shaft extending into the chamber to adjacent a drum wall, means moveably supporting the same, means moveably supporting said drum wall on the shaft for resisting air pressure on the drum upon evacuation of the chamber, a hopper for receiving objects under atmospheric pressure and having the apertured drum wall passing therethrough for pickup of objects over the apertures, means for rotating the chamber, and means within the chamber for interrupting the action of vacuum on and releasing of the objects from the chamber as the apertures reach a given position.

4. A device for picking up small objects and depositing the objects in a predetermined pattern and spacing on a surface remote from the pick-up point, comprising a frame mounted for movement relative to said remote surface, a stationary shaft removably mounted on the frame and having passages for air flow therethrough, a chamber rotatably mounted on the shaft and sealed thereto in air-tight relation, one of said shaft passages serving for evacuation of the chamber, the chamber comprising a hub and plate rotatably mounted on the shaft and forming one wall of the chamber, the hub and plate being of substantial thickness for resisting deformation by air pressure upon evacuation of the chamber, and a thin-wall open-ended drum supported by and sealed in air-tight relation on the plate and forming the other walls of the chamber, the drum wall having apertures therein and being mounted in readily interchangeable relation on the hub and plate, the shaft extending into the chamber to adjacent a drum wall, means including a plate bearing on said drum wall and a ball bearing acting between the plate and the shaft for movably supporting said drum wall against air pressure upon evacuation of the chamber, a hopper for receiving objects under atmospheric pressure and having the apertured drum wall passing therethrough for pick-up of objects over the apertures, means for rotating the chamber, and means within the chamber for interrupting the action of vacuum on and releasing of the objects from the chamber as the apertures reach a given position.

References Cited in the file of this patent

UNITED STATES PATENTS

| | | |
|---|---|---|
| 1,006,984 | Sheetz | Oct. 24, 1911 |
| 1,762,671 | Slathar | June 10, 1930 |
| 2,152,758 | Cox | Apr. 4, 1939 |